United States Patent [19]

Trevino et al.

[11] 4,300,495
[45] Nov. 17, 1981

[54] CAR THEFT PREVENTER

[76] Inventors: Carlos S. Trevino; Isidro S. Trevino, both of 16311 Shamhart Dr., Granada Hills, Calif. 91344

[21] Appl. No.: 77,570

[22] Filed: Sep. 21, 1979

[51] Int. Cl.³ .............................................. B60R 25/04
[52] U.S. Cl. ......................... 123/198 B; 123/198 DC; 123/146.5 B; 180/287; 340/64; 340/63
[58] Field of Search ..... 123/198 B, 198 DC, 146.5 B; 180/287; 340/64, 63; 315/209; 307/10 AT

[56] References Cited
U.S. PATENT DOCUMENTS

| | | | |
|---|---|---|---|
| 3,559,757 | 2/1971 | Weiss et al. | 307/10 AT |
| 3,687,216 | 8/1972 | Tracey | 180/287 |
| 3,907,060 | 9/1980 | Burton et al. | 180/287 |
| 4,074,672 | 2/1978 | La Due et al. | 340/64 |
| 4,147,151 | 4/1979 | Wright | 123/198 DC |
| 4,188,621 | 2/1980 | Heckelman et al. | 340/63 |
| 4,209,709 | 6/1980 | Betton | 340/64 |
| 4,222,033 | 9/1980 | Brown | 307/10 AT |

Primary Examiner—Charles J. Myhre
Assistant Examiner—R. A. Nelli
Attorney, Agent, or Firm—Georges A. Maxwell

[57] ABSTRACT

An electrically operated disabling system engageable in the ignition or fuel supply support system of an automobile engine, the operation of which is under control of a master control switch for the ignition system, said disabling system includes a normally closed relay switch related to one of the support systems to disable that support system and cause the engine to stop operation when said relay switch is opened, an electrically operated time delay switching device under control of the master control switch and operating to cause the relay switch to open and disable its related support system after operation of the engine for a limited predetermined period of time; and a normally operable on and off switch to selectively put the disabling system into and out of service.

2 Claims, 3 Drawing Figures

CAR THEFT PREVENTER

This invention has to do with an electrical system to prevent the unauthorized use or theft of automobiles and is particularly concerned with a novel timed disabling system, incorporated in the ignition system of a related automobile engine.

STATE OF THE ART

The provision of a simple yet effective means to inhibit or prevent the unauthorized use and/or theft of automobiles has long been sought.

The prior art is repleat with various antitheft systems and/or means. Such systems and/or means include key-operated locks to releasably lock and prevent turning of the steering wheels of related automobiles, audible alarm systems which sound when thieves or unauthorized persons seek to steal or use the automobiles with which the systems are related, switch controlled disabling systems to disable the ignition systems and/or the fuel systems of the engines of the automobiles with which they are related and various other similar or analogous devices, systems and/or means.

The means notable common characteristic of the devices, systems and/or means provided by the prior art to prevent the theft of automobiles is that they function in a manner so that thieves are made aware of their presence immediately upon undertaking theft of the automobiles with which they are related.

Further, the manner in which they operate or function is such that those who make a practice of stealing automobiles soon learn what their function is, where and how they are related to the automobiles, and how to easily and quickly disarm them.

The most economical and practical systems provided by the prior art are those systems which disable the distributor or ignition systems of the automobiles with which they are related. These systems characteristically include a solenoid switch or the like in one of the conductor lines connected with the coil and/or the distributor and such that when opened or closed, they disable the ignition system by opening or shunting the system to ground.

Such systems are commonly turned off and on by manually operable toggle switches or the like mounted in hidden or obscure places in the driver's compartment of the automobiles in which they are related. For example, the toggle switches are normally mounted beneath the dashboards of the automobiles where they are obscure from view, yet conveniently manually accessible to those who know of their existence and location.

When a thief seeks to start an automobile engine with a disabling system or circuit incorporated or connected in the distributor system of the engine, there is no sign or indication of spark or ignition and the thief, if at all knowledgeable, looks for and quickly finds the obscure control switch or opens the engine compartment of the automobile and examines the lines connected with the coil and distributor and quickly finds the disabling means. If he finds either, he can quickly operate, remove or by-pass the disabling system and proceed with theft of the automobile at his leisure.

It is rather well-documented that most fuel system or ignition system disabling theft prevention means for automobiles can be discovered and thwarted by most "professional" car thieves in two or three minutes and are only effective to prevent theft of automobiles by novices in the art of stealing automobiles.

OBJECTS AND FEATURES OF THE PRESENT INVENTION

It is an object of the present invention to provide a novel system for selectively disabling the ignition system of an automobile engine which is effective to prevent theft of the automobile by a thief who seeks to drive the automobile away.

It is an object and feature of this invention to provide a disabling system of the general character referred to above which includes a time clock or timing means which enables the engine with which the system is related to be started and to run or operate a short period of time before the system functions to disable the ignition system and stop operation of the engine or automobile.

Yet another object and feature of our invention is to provide a disabling system or automobile engine ignition systems of the character referred to above which function so that the thief can operate and move an automobile a short or limited distance before the automobile is disabled and stops, whereby the thief is likely to find himself with the automobile stopped in a location which inihibits or thwarts his continuing or proceeding with the theft of the automobile.

Still another object and feature of the invention is to provide a disabling system for automobile ignition systems of the character referred to above which is such that it simulates a serious disabling fault in one of the systems of the automobile and which is likely to discourage a thief seeking to drive the automobile away from proceeding with the theft.

Finally, it is an object and feature of our invention to provide a disabling system of the character referred to which is economical to manufacture, easy and economical to install in an automobile, and which is convenient for the owner of the automobile to operate.

The foregoing and other objects and features of our invention will be fully understood from the following detailed description of typical preferred forms and applications of the invention throughout which description reference is made to the accompanying drawings.

DETAILED DESCRIPTION OF THE INVENTION

Figure 1:
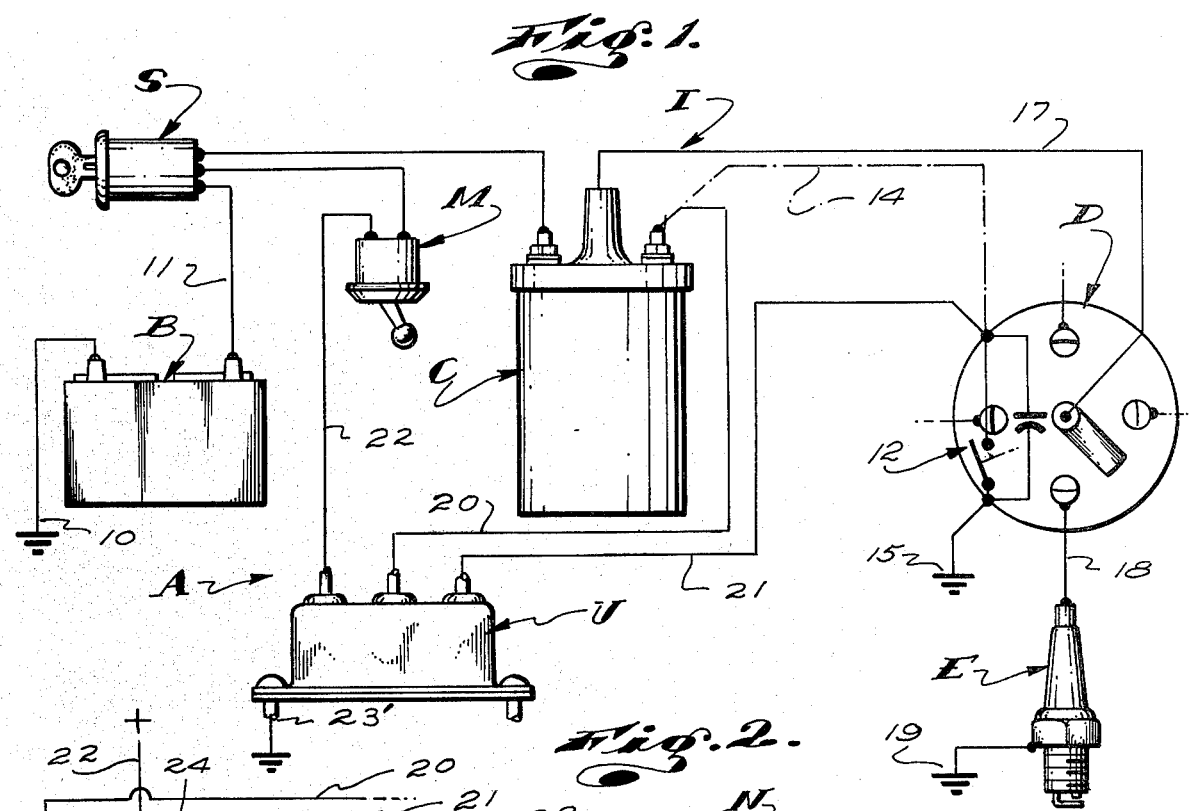
FIG. 1 is a diagram showing our disabling system engaged in a related automobile engine ignition system.

The present invention resides in an electric disabling system A in combination with the electrical ignition system of an automobile engine and which is operable to be put into and out of operation and is such that when in operation, it will permit or allow the engine with which it is related to operate normally for a limited predetermined period of time, whereupon it will cause the engine to stop operating.

The ignition system I is shown as a conventional ignition system for internal combustion automobile engines. The system I includes generally a power source in the form of a battery B, a key lock ignition switch S, a coil C, a distributor D and a plurality of sparkplugs E (one is shown).

In accordance with common practice, the negative side of the battery B is grounded as at 10. The positive side of the battery B is connected with the positive side or end of the primary winding of the coil C (not shown) by a line 11 and the switch S is engaged in the line 11. The negative side or end of the primary winding of the coil (not shown) is connected with the positive side of the switching or breaker means 12 of the distributor D by a line 14 (shown in phantom line). The negative side of the breaker means 12 is grounded, as indicated at 15. The secondary winding of the coil (not shown) is connected with the distributor means 16 of the distributor D by a conductor line 17 and the means 16 is connected with each sparkplug E (one is shown) by a related line 18. The sparkplugs E are grounded, as indicated at 19.

The operation of the ignition system I shown in the drawings and briefly described in the foregoing is common knowledge and is well known to all of those who are reasonably familiar and/or skilled in the art to which this invention relates. Accordingly, further detailed description of the system I and its mode of operation is not necessary and will be dispensed with so as not to unduly burden this disclosure.

It will suffice to note that the system I is put into and taken out of operation by the key controlled ignition switch S, which switch is normally located in the driver's compartment of the automobile, for convenient access and manual operation.

Further, when the switch S is closed, the system will function to sustain ignition and maintain operation of the automobile engine with which the system is related or forms a part of.

In common practice, the switch S, in addition to opening and closing the power supply system I, opens and closes certain independent secondary power circuits in the automobile, such as the power circuit or circuits for radios, fans, and other electrical accessories which are only operated when the automobile is in use. These secondary power circuits are isolated from the ignition system I so that the appliances or accessories powered thereby are not adversely affected by feedback from the coil C.

It is important to note that if the circuit from the switch S to the coil C or the circuit from the coil C to the breaker means 12 of the distributor D is broken or open, the ignition system I is disabled and will not sustain operation of the automobile engine.

In its broadest sense and simplest form, the system A here provided includes a normally closed switch R series connected in the circuit between the switch S and the breaker means 12 of the distributor D and a timer or clock means T which can be selectively be put into and out of operation and which, when put into operation, functions to open the switch R a predetermined period of time after the switch S has been closed and the engine has been put into operation.

Figure 2:
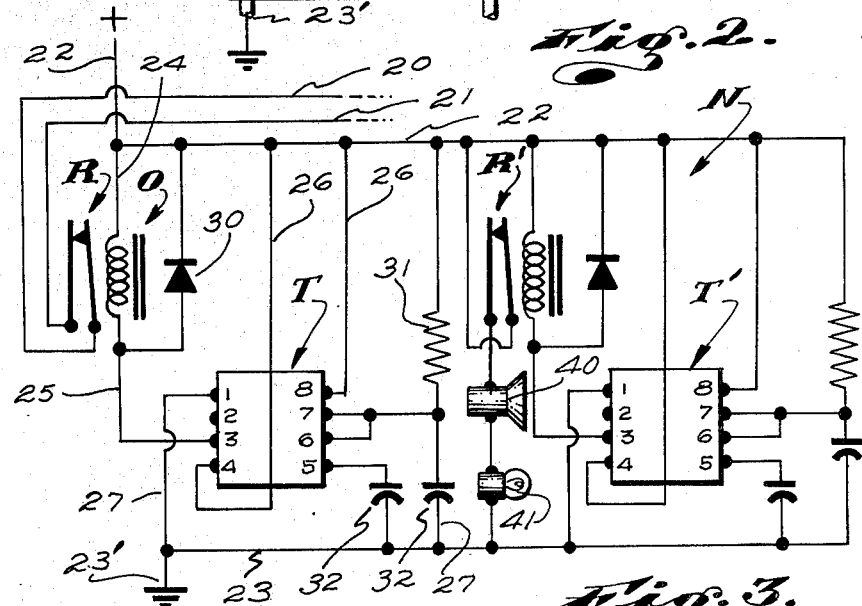
FIG. 2 is a circuit diagram of a portion of the disabling system.

In the form of the invention illustrated in FIGS. 1 and 2 of the drawings, the system A includes a box-like timer controlled switching unit U in which the switch R and the timer or clock means T are housed and which is such that it can be suitably mounted in substantially any desired location within its related automobile.

The switch R is a normally closed electromagnetically actuated relay switch within the unit U and has one terminal connected with the negative terminal of the coil C by a line 20 and its other terminal connected with the positive side or terminal of the breaker means 12 of the distributor D by a line 21.

The lines 20 and 21, with the switch R engaged therebetween, are connected with and establish the circuit between the negative terminal of the coil C and the means 12 of the distributor D and take the place of the line 14.

In practice, the line 14 can be obscurely broken or rendered ineffective and can be left in place as a mimic line and the lines 20 and 21 can be extended from their terminals of the coil and means 12 in a manner to obscure and make detection of the system A difficult.

The timer or clock means T within the unit U is electrically operated and can be selectively put into and out of operation. When in operation, it operates to direct and conduct an operating current through the electro magnetic operating means O of the relay R and to thereby cause the relay R to open at the end of a predetermined period of time after the switch S is closed and the engine is put into operation.

The system A of which the relay R, timer means T and the lines 20 and 21 are parts, includes a positive or power supply line 22 and a negative or ground line 23.

The power line 22 is connected with and extends from a power supply or power source in the automobile which is under control of the switch S and which is preferably separate and/or isolated from the ignition system I so that the means T of the system is not damaged or adversely affected by feed-back from the coil C of the ignition system I. Such an isolated or separate power source of the system A eliminates the need to provide the system with complicated and costly filtering means to prevent undesirable feed-back from the coil reaching the means T.

The operating means O of the relay R has a positive terminal or side connected with the line 22 by a line 24 and has a negative terminal or side from which a line 25 extends.

The timing means T in the preferred carrying out of the invention is a solid state pulse timer having at least one terminal connected with the line 22 by at least one line 26 and at least one selected terminal connected with the ground line 23 by at least one line 27. The line 25 extending from the operating means O of the relay R is connected with a selected terminal of the pulse timer T, which terminal is normally switched off or is non-conductive for a predetermined period of time each time the timer is energized and put into operation. Following that period of time, that terminal of the timer is turned off or made conductive and establishes a closed circuit between the lines 22 and 23 and through the means O of the relay R, thereby causing the relay R to open and to open or break the circuit between the coil C and the breaker means 12 of the distributor D.

In addition to the foregoing, to effect desired operation of the timer T and to establish proper balance and flow of current in and through the system, supplemental electrical components and/or devices such as a diode 30, resistor 31 and compacitors 32 are suitably connected with and related to the relay R and the timer T.

Since a considerable number of different makes and models of solid state pulse timers suitable for use in carrying out this invention are commercially available and since the manner in which such timers can or must be connected with and between the lines 22 and 23 and with the relay switch R can differ widely from the circuits shiown in FIG. 2 of the drawings; and since the kinds, numbers and relationship of supplemental electrical components and devices used in such circuits is subject to wide variation, further detailed description and/or explanation of the timer T and its relationship in the system A need not and will not be pursued.

It is sufficient to note and to state that the timer is connected with and between the lines 22 and 23, is a normally non-conductive or open switching device and is connected with the operating means O of the normally closed relay switch R to open that relay switch following a predetermined period of time after the timer is first energized and put into operation and to maintain the relay open so long as the timer remains energized.

In addition to the foregoing, the system A includes a manually operable on and off switch M engaged in the line 22 and operable to turn the system A on and off and to thereby arm or disarm the system A. The switch M can be any suitable form of on and off switch and is preferably a standard manually operable on and off toggle switch. The switch M is mounted within the driver's compartment of the automobile where it is easily and conveniently manually accessible and yet is normally visibly obscured. For example, the switch M can be mounted in a conveniently manually accessible, yet visibly obscure, location on and beneath the dashboard or beneath the driver's seat of the automobile.

When the switch M is off, the timer T is disarmed or off and the relay R will remain closed so that the ignition system I remains able and the automobile's engine will remain in operation. That is, when the switch M is open, the automobile engine, with its related support systems, establishes and maintains operation as though the disabling system A here provided did not exist. On the other hand, when the switch M is closed, the system A is armed and is such that after the switch S is closed and the automobile engine is put into operation, the relay R will open and disable the ignition system I and cause the engine to stop operation, after a predetermined period of time.

In practice, and as shown in FIG. 1 of the drawings, the housing of the unit U, in which the relay R, timer T and related circuitry are arranged, can be a metal electrically conductive structure with which the ground line 23 connects or which establishes the ground 23 and which is ground connected and secured to a ground or electrically negative structural part of the automobile as by means of a screw fastener and as indicated at 23 in the drawings. In practice, the unit can be screw fastened to the automobile frame, the fire wall or to any other of the various negative or ground parts and/or portions of the automobile.

Further, and as shown in FIG. 1 of the drawings, the housing of the unit U is preferably provided with openings in which insulative rubber grommets are engaged and through which the lines 20, 21 and 22 extend.

It will be apparent that when the control switch M is closed and the switch S is open, the system A is armed, but both systems A and I are out of service. Subsequently, when the switch S is closed, the ignition system I put into operation and the automobile engine can be started and made to operate and drive the automobile. After the switch S is closed and while the automobile engine is operating, the time clock T of the system A is energized and put into operation. Within a predetermined time period, the time clock T functions to operate and to open the normally closed relay R disabling the system I and causing the automobile engine to stop or cease functioning.

In practice, for example, the time clock T can be made or set to effect actuation and opening of the relay and disable the ignition system I in about 10 seconds following closing of the switch S. This is sufficient time to enable a thief to start the automobile engine, pause to "warm" the engine and be assured that it is operating properly and to drive the automobile a short distance, possibly as much as twenty or thirty feet, or part way out of and away from a parking place in which the automobile was left parked, before the ignition system I is disabled and the automobile is stopped. Thereafter, it can be anticipated that the thief will open and again close the ignition switch S to restart the engine in an effort to perfect its theft. Upon such opening and closing of the switch S, the system A will reset, and the engine of the automobile will restart and the automobile can be driven for another ten seconds whereupon it will again be disabled and stopped by the system A. The above procedure can be repeated again and again, but it is most likely that the thief will be discouraged and abandon his attempts to steal the automobile the second or third time it has been disabled and stopped since he will likely believe that the automobile has some serious defect which will prevent him from safely effecting its theft.

An important aspect and/or feature of this invention resides in the fact that the thief can effect operation of and drive the automobile a short distance which is calculated to place the disabled automobile in an exposed location and/or position where the thief' activities will draw attention and be discovered by other persons within sight of the automobile. In the automobile oriented society of the United States, a stalled or otherwise disabled automobile on or entering upon a roadway is quickly recognized by an overwhelming majority of citizens as a potential serious hazard. Most persons when seeing a stalled automobile will watch with keen attention to see what the driver's reactions are and to see what will happen; that is, whether the driver will or will not be able to extract himself from the dangers of the situation in which he finds himself. Further, it can be anticipated that certain persons coming upon or seeing such a situation will hasten to the aid of the unfortunate driver.

The foregoing situation of a stalled automobile and the attention of others it attracts is a situation which an automobile theif cannot safely be confronted with and from which a thief, having any sense of reality, will seek to extract himself by abandoning the automobile and leaving the scene without drawing undue attention to himself.

In light of the above, it can be said that an object of this invention is to enable an automobile thief to operate and move an automobile which he seeks to steal a sufficient distance to place him where he is likely to draw the special attention of others and from which he cannot safely or reasonably extract himself without abandoning the automobile.

In the preferred carrying out of the invention and as shown in FIG. 2 of the drawings, a signalling means N can be provided to indicate that the switch M is closed and that the system A is armed. The signalling means N is provided so that the owner of the automobile with which the system A is related is not likely to forget that the system A has been armed and find himself in an embarrassing or inconvenient situation where his automobile becomes disabled when he seeks to operate it. The means N can include a signal lamp or can, as indicated in the drawings, include a buzzer or horn 40 and/or a lamp 41 electrically connected between the lines 22 and 23 and under control of a normally closed electro-magnetic relay switch R². The switch R² is under control of a time clock T' and related circuitry, connected with the lines 22 and 23 which are preferably the same as the time clock T and its related circuitry described above. With the means N, when the ignition switch S is closed, the buzzer or horn 40 sounds for a limited predetermined period of time, for example, three or four seconds before the time clock T' or timer causes the relay R to open.

It will be apparent that the means N is similar to the buzzer and lamp signalling means provided for seat belts in most automobiles manufactured in recent years.

In one installation of the invention, the buzzer and lamp of the seat belt warning system of the automobile were utilized for the buzzer 40 and lamp 41 of the means N and were connected so that they served the dual function of warning that the seat belts were not secure, and that the system A was armed, after closing the switch S. In the same installation, the hookup was modified so that the seat belt warning light was left functional and the seat belt warning buzzer was disconnected from the seat belt warning system and connected with the system A.

In the above noted particular installation or installations, it will be apparent that a thief, upon entering and starting the automobile and upon seeing and/or hearing the seat belt warning light and buzzer, will not be aware of the fact that the warning signal or signals are related to or having anything to do with the disabling system A.

Figure 3:
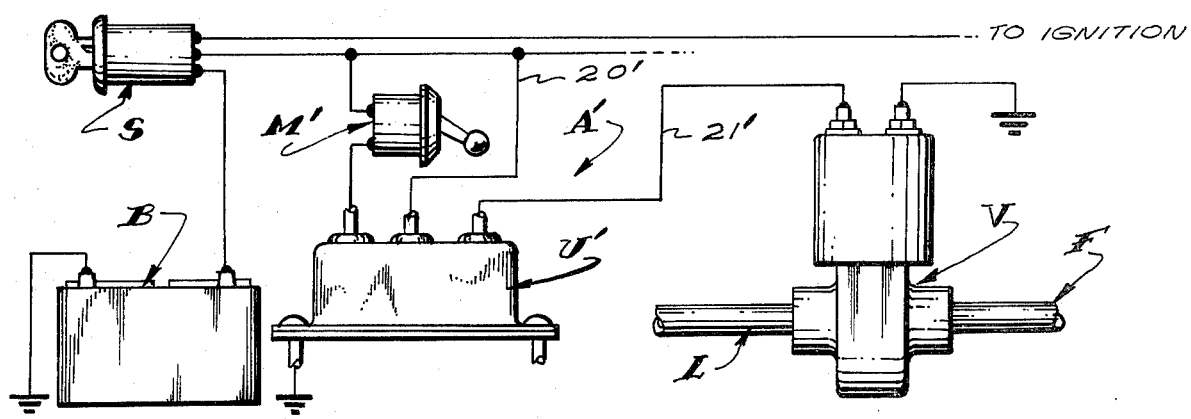
FIG. 3 is a diagrammatic view of another embodiment of the invention.

In practice, and as diagrammatically illustrated in FIG. 3 of the drawings, the disabling systems that we provide is such that it can be easily and conveniently made to disable the fuel supply system of the engine of an automobile. As shown, the system A' is connected with the same power source and is related with the battery B and switch S in essentially the same manner as is the system A in the first form of the invention. In this second form of the invention, the lines 20 and 21 of the system A', rather than connected with and between the coil C and breaker means 12 of the ignition system of the automobile, extend between and connect with the terminals of a solenoid operated shutoff valve V engaged in the fuel line L of the fuel supply system F of the automobile. It will be apparent that in this modified form of the invention, the system A' will function in substantially the same manner that the system A functions except that the automobile will be disabled by disabling the fuel supply system, rather than the ignition system.

In practice, if the automobile is equipped with and electric fuel pump, it will be apparent that the disabling system here provided could be effectively connected with the pump and operate to disable the pump whereby essentially the same end results would be attained.

It is to be noted and it will be apparent that the time clock or timer T need not be a solid state counter type device such as shown and described above, but could be any one of the many other suitable forms of time controlled or clock operated switching devices and/or means which are suitable for effecting the operation of a relay switch and which are commonly used and made available throughout the electrical or electronics art. The use of other forms of timing means instead of the timer T shown and described is contemplated and will fall in the broader scope and spirit of this invention.

Having described only typical preferred forms and applications of our invention, we do not wish to be limited to the specific details herein set forth, but wish to reserve to ourselves any modifications and/or variations that may appear to those skilled in the art and which fall within the scope of the following claims:

Having described our invention, we claim:

1. In combination, an internal combustion engine with an electric support system to maintain the engine operating, a power supply for the support system and a master control switch manually operable between open and closed positions connected in series between the power supply and the support system; a disabling system to shut off power to the support system and cause the engine to stop operating and including a normally closed relay switch series connected between the master control switch and the support system and an operating circuit operable to energize and cause time delayed operation and opening of the relay switch and including a normally open electrically powered time delay switching device connected with and between the relay and with the power supply between the support system and the master control switch, said switching device operating to close and cause the relay to open at the end of a predetermined period of time each time the master control switch is operated from its open position to its closed position; a manually operable on and off switch connected in series between the switching device and the power supply to selectively put the disabling system into and out of service; and an electrically powered signalling device connected with the power supply under control of the master control switch, a normally closed second relay switch series connected between the signalling device and its power source and a normally open second time delay switching device connected with the second relay switch and connected in parallel with the first mentioned time delay switching device and operating to open and to energize and cause the second relay switch to open following a predetermined period of time each time the master switch is operated from its open position to its closed position.

2. The combination set forth in claim 1 wherein said support system is an ignition system including a coil with a primary winding having one end connected with the master control switch by a first line, a distributor connected with the other end of the winding by a second line, said distributor operates to sequentially deliver current from the coil to sparkplugs engaged in the engine to maintain the engine operating said relay switch is series connected in said second line.

* * * * *